United States Patent
Cullen et al.

(10) Patent No.: US 7,557,481 B2
(45) Date of Patent: Jul. 7, 2009

(54) ROTOR FOR AN ELECTRICAL MACHINE

(75) Inventors: John J A Cullen, Derby (GB); Phillip J Doorbar, Derby (GB); Bradley S Payne, Leek (GB); Stephen W Hill, Ambergate (GB)

(73) Assignee: Rolls-Royce, PLLC, London (GB)

( * ) Notice: Subject to any disclaimer, the term of this patent is extended or adjusted under 35 U.S.C. 154(b) by 279 days.

(21) Appl. No.: 11/388,989

(22) Filed: Mar. 27, 2006

(65) Prior Publication Data

US 2006/0226724 A1   Oct. 12, 2006

(30) Foreign Application Priority Data

Apr. 9, 2005   (GB)   ................. 0507217.8

(51) Int. Cl.
*H02K 21/12* (2006.01)

(52) U.S. Cl. ............. 310/156.26; 310/156.08; 310/45

(58) Field of Classification Search ............ 310/156.01, 310/156.08, 156.23, 156.26, 261, 42–45
See application file for complete search history.

(56) References Cited

U.S. PATENT DOCUMENTS

| 4,678,954 | A | 7/1987 | Takeda |
| 5,140,210 | A | 8/1992 | Shirakawa |
| 5,220,233 | A * | 6/1993 | Birch et al. ............. 310/156.28 |
| 6,069,421 | A * | 5/2000 | Smith et al. .................... 310/43 |
| 6,097,124 | A * | 8/2000 | Rao et al. .............. 310/156.26 |
| 6,751,842 | B2 * | 6/2004 | Roesel et al. .................. 29/598 |
| 2003/0206824 | A1 | 11/2003 | Adams |
| 2004/0051416 | A1 | 3/2004 | Yamada |

FOREIGN PATENT DOCUMENTS

| FR | 2 779 584 A | 6/1998 |
| GB | 2 052 319 A | 1/1981 |
| GB | 2 388 479 A | 11/2003 |
| JP | 61073559 AB | 4/1986 |
| JP | 61075559 AB | 4/1986 |
| JP | 3 273 841 AB | 12/1991 |

* cited by examiner

*Primary Examiner*—Thanh Lam
(74) *Attorney, Agent, or Firm*—Jeffrey S. Melcher; Manelli Denison & Selter, PLLC (57) ABSTRACT

A rotor 10 for an electrical machine comprising a rotor body 12, at least one magnet 18 coupled to the rotor body 12 and a retainer 22 for retaining the at least one magnet 18 to the rotor body 12, the retainer 22 comprising at least one elongate fibre in a metal matrix.

14 Claims, 7 Drawing Sheets

ROTOR FOR AN ELECTRICAL MACHINE

FIELD OF THE INVENTION

Embodiments of the present invention relate to a rotor. In particular, they relate to a rotor for an electrical machine.

BACKGROUND OF THE INVENTION

An 'electrical machine' may be a motor or a generator. A generator, for example, typically includes a stator and a rotor. The stator defines a cavity in which the rotor is located and comprises a plurality of coiled wires. The rotor comprises a plurality of magnets and rotates relative to the stator so that electrical energy is induced in the coils of wire.

Typically, the magnets are coupled to an exterior surface of the body of the rotor by an adhesive and a retainer. In operation, the rotor rotates at high speed (i.e. greater than 10,000 rpm), which creates an outwards radial force on the magnets which cannot be retained solely by the adhesive coupling. Consequently, it is necessary to retain the magnets to the body of the rotor using a retainer.

Currently, retainers comprise a metallic sleeve or carbon fibres in a binding resin such as epoxy. The magnets are put into place on the rotor body using a complex jig and then wrapped with resin impregnated carbon fibres, which are then cured to form the retainer.

It is desirable to provide an alternative retainer and method for forming a retainer.

SUMMARY OF THE INVENTION

According to one aspect of the present invention there is provided a rotor for an electrical machine comprising a rotor body, at least one magnet coupled to the rotor body and a retainer for retaining the at least one magnet to the rotor body, the retainer comprising at least one elongate fibre in a metal matrix.

An advantage provided by using a retainer comprising at least one elongate fibre in a metal matrix (metal matrix composite—MMC) is that the thickness of MMC required for retaining the magnets to the rotor may be less than that for a retainer comprising carbon fibre in an epoxy resin. This may reduce the distance between the magnets and the coils of wire and thereby increase the magnetic flux density in the air gap. Alternatively, the overall size and weight of an electrical machine may be reduced while at the same time maintaining a similar rated power to a larger electrical machine using a retainer comprising carbon fibre in an epoxy resin.

A further advantage is that the retainer acts as an electromagnetic screen and reduces\removes electrical 'eddy' currents flowing in the magnets.

One benefit provided by using a retainer comprising a metal matrix composite (MMC) is that it may be operated at higher temperatures than a retainer comprising carbon fibres in an epoxy resin. For example an MMC retainer based on a titanium 6 aluminium 4 vanadium matrix material may be operated at 300° C. (and may be operated at higher temperatures if higher temperature matrix alloys are used), whereas the maximum operational temperature of carbon fibre in epoxy resin is approximately 200° C.

Additionally, an MMC retainer is more closely thermally matched with the other components of the rotor than a retainer comprising carbon fibre in an epoxy resin and will expand\contract in a similar way to the other rotor components. This may reduce stress within the rotor when the rotor experiences temperature fluctuations.

The conductivity of thermal energy may be greater in an MMC retainer than in a retainer comprising carbon fibres in an epoxy resin. This may provide greater conduction of thermal energy from the rotor body and help to reduce the temperature of the rotor body when the electrical machine is operating.

Therefore, an MMC retainer may be used in a greater range of temperatures than a retainer comprising carbon fibres in an epoxy resin.

An MMC retainer may also be more resistant to damage caused by a damp\humid environment than a retainer comprising carbon fibres in an epoxy resin. Titanium MMC retainers are particularly advantageous because they are resistant to corrosion caused by a damp\humid environment.

The retainer may include an inner sleeve, an outer sleeve and a portion including the at least one elongate fibre in the metal matrix. The portion may be sandwiched between the inner and outer sleeves. The inner and outer sleeves may each substantially comprise metal.

The rotor body may have an exterior surface and the retainer may retain the at least one magnet to the exterior surface. The rotor may further comprise a means for connecting the rotor to a drive means. The retainer may be integral with the means for connecting the rotor to a drive means. The means for connecting the rotor to a drive means may be an end cone.

Another advantage of connecting the retainer and means for connecting the rotor to a driver is that the rotor body may be optimised for its magnetic properties rather than its mechanical properties.

One advantage provided by an integral retainer and end cone is that a fastener is not required to connect the rotor to the end cone. Consequently, this may result in the rotor requiring less maintenance due to wear of the fastener. Additionally, due to the absence of the fastener, the rotor may weigh less than a prior art rotor.

The retainer may comprise an exterior surface and an interior surface, the interior surface may comprise at least one cavity for receiving the at least one magnet. The at least one cavity provides a benefit in that it helps to locate the magnets during assembly.

The at least one elongate member may comprise silicon carbide. The metal matrix may comprise titanium. The at least one magnet may be coupled to the rotor body by an adhesive. The radial exterior surface of the at least one magnet may contact the retainer.

The retainer may be a pre-formed sleeve.

According to another aspect of the present invention there is provided a retainer for retaining at least one magnet to a rotor body as described in the preceding paragraphs.

According to a further aspect of the present invention there is provided an electrical machine comprising a stator and a rotor as described in the preceding paragraphs.

The electrical machine may be a generator or a motor.

According to another aspect of the present invention there is provided a method of operating a rotor for an electrical machine comprising providing rotary motion to the rotor, retaining the at least one magnet to the rotor with a retainer, wherein the retainer comprises at least one elongate member in a metal matrix.

According to a further aspect of the present invention there is provided a method of forming a sleeve for retaining at least one magnet to a rotor body, the method comprising: providing a member; wrapping at least one elongate fibre around the member to form an assembly; and applying heat and pressure to the assembly to form a sleeve.

The method may further comprise applying a matrix material to the at least one elongate fibre. The matrix material may be a vapour, a liquid or a solid. The matrix material may be a metal. The metal may be titanium.

The member may be an inner sleeve.

The method may further comprise providing an outer sleeve. The elongate fibre and matrix material may be sandwiched between the inner sleeve and the outer sleeve.

The method may further comprise providing at least one magnet to a cavity within an interior surface of the sleeve. The method may further comprise providing a rotor body, cooling the rotor body and inserting the rotor body into the sleeve. The at least one elongate fibre may comprise silicon carbide.

The application of heat and pressure may be hot isostatic pressing (HIP). The at least one magnet may be coupled to the rotor body by an adhesive.

The elongate fibre may be a resin impregnated elongate fibre.

Alternatively, the member may be a mandrel. The method may further comprise removing the mandrel after the application of heat and pressure. The method may further comprise applying a matrix material to the at least one elongate fibre. The matrix material may be a vapour, a liquid or a solid. The matrix material may be a metal. The metal may be titanium. Alternatively, the elongate fibre may be a resin impregnated elongate fibre. The method may further comprise providing at least one magnet to a cavity within an interior surface of the sleeve. The method may further comprise providing a rotor body, cooling the rotor body and inserting the rotor body into the sleeve. The at least one elongate fibre may comprise silicon carbide.

According to another aspect of the present invention there is provided a Sleeve as formed by the method as described in the preceding paragraphs.

According to another aspect of the present invention there is provided a method of retaining at least one magnet to a rotor, the method comprising: providing a sleeve; providing at least one magnet to a cavity within an interior surface of the sleeve; providing a rotor body, cooling the rotor body and inserting the rotor body into the sleeve.

BRIEF DESCRIPTION OF THE DRAWINGS

For a better understanding of the present invention reference will now be made by way of example only to the accompanying drawings in which.

DETAILED DESCRIPTION OF THE INVENTION

The figures illustrate a rotor 10 for an electrical machine comprising a rotor body 12, a plurality of magnets 18 coupled to the rotor body 12 and a retainer 22 for retaining the plurality of magnets 18 to the rotor body 12, the retainer 22 comprising at least one elongate fibre 24, 26 in a metal matrix 28.

Figure 1:
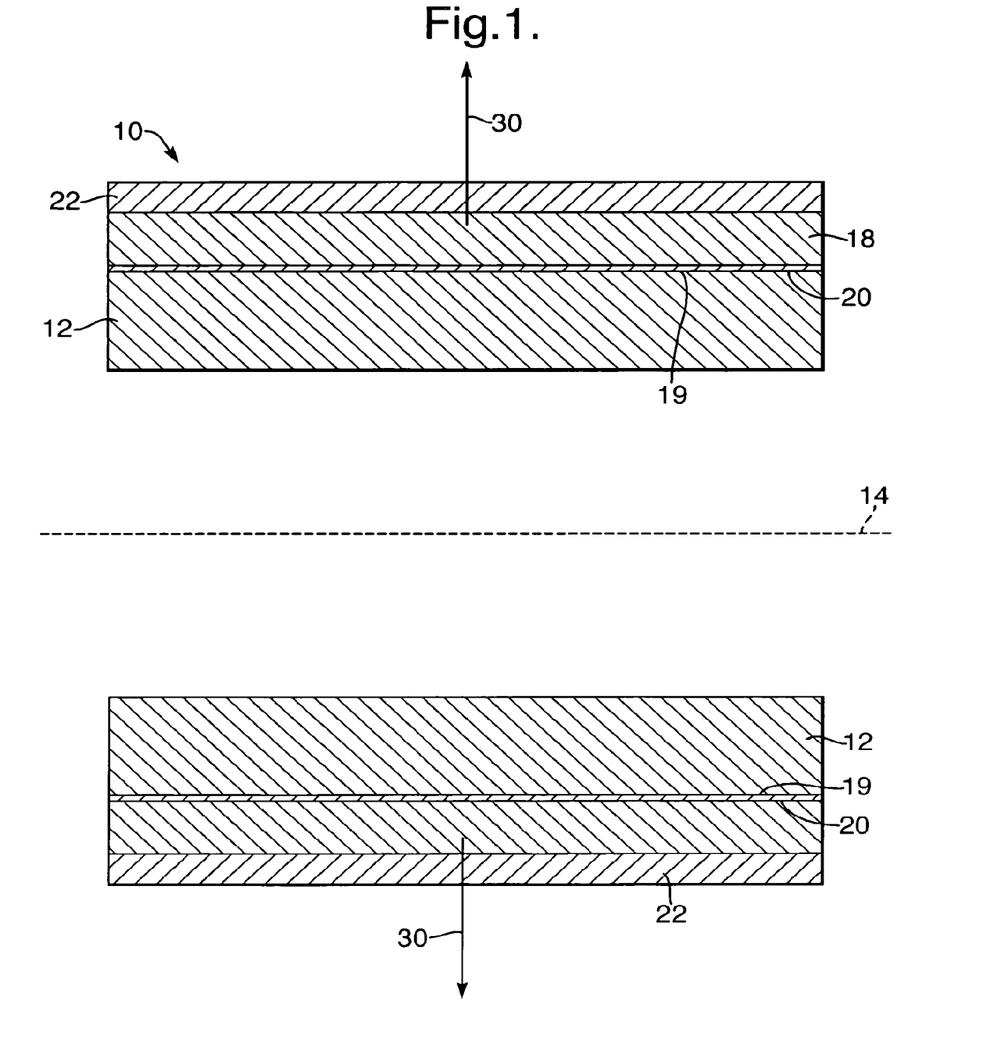
FIG. 1 illustrates a schematic axial cross sectional diagram of a rotor according to a first embodiment of the invention.

FIG. 1 illustrates a schematic, axial cross sectional diagram of a rotor 10 for an electrical machine. The rotor 10 comprises a rotor body 12 which is in this example, a hollow cylindrical rotor body. The rotor body 12 in use rotates about an axis 14 in the directions indicated by arrows 16 illustrated in FIG. 5.

A plurality of magnets 18 are coupled to an exterior surface 19 of the rotor body 12 by an adhesive 20 which at least partially retains the magnets 18 to the rotor body 12. In this example, the magnets 18 are permanent magnets. A retainer 22 extends around the circumference of the rotor body 12 to retain the magnets 18 to the rotor body 12. The retainer 22 comprises a metal matrix composite (MMC) which is described in the following paragraphs with reference to FIG. 2.

Figure 2:
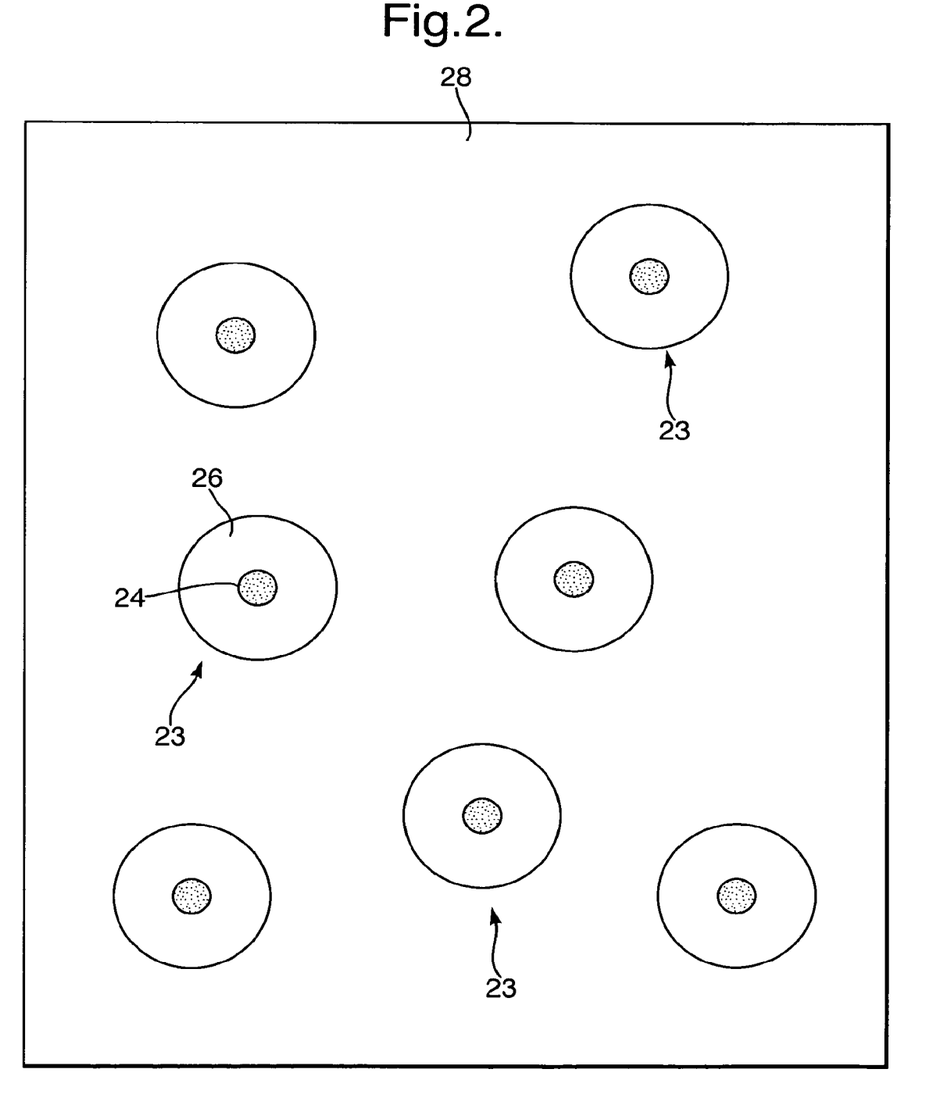
FIG. 2 illustrates a schematic diagram of a metal matrix composite.

FIG. 2 illustrates a schematic diagram of a metal matrix composite (MMC) comprising one or more fibres in a metal matrix. The metal matrix may comprise a single metal element or a metal alloy. The strength of an MMC may be chosen by controlling the volume ratio of fibres to metal matrix. In the retainer 22, the fibres extend circumferentially around the axis 14.

One example of an MMC (as illustrated in FIG. 2) comprises a plurality of carbon fibres 23 each including a core 24 (which comprises carbon, tungsten or any other suitable material) coated in silicon carbide 26. The plurality of fibres may be embedded in a titanium (Ti-6/4 titanium alloy with 6% aluminium and 4% vanadium) matrix 28. One benefit provided by a titanium metal matrix composite (TiMMC) is that it has high tensile strength and stiffness. Another benefit is that titanium is non-magnetic which aids assembly of the electrical machine.

Alternatively, by way of example, an MMC may comprise silicon carbide fibres in an aluminium matrix, alumina fibres in an aluminium matrix, carbon fibres in a magnesium matrix, silicon carbide fibres in a copper or iron based matrix or any other suitable combination of metal and fibres.

With reference to FIG. 1, in use, the rotor body 12 is rotated by a drive means (not illustrated in FIG. 1). The rotation exerts a radially outwards force on the magnets as indicated by arrow 30. The adhesive 20 does not provide sufficient adhesion to prevent the magnets 18 from breaking away from the rotor body 12 when it rotates at high speed. Due to the high strength of MMC's, the retainer 22 prevents the magnets 18 from breaking away from the rotor body 12 when the rotor body 12 rotates at high speed. The benefits provided by using a retainer 22 comprising MMC are discussed in the following paragraphs with reference to FIG. 3.

Figure 3:
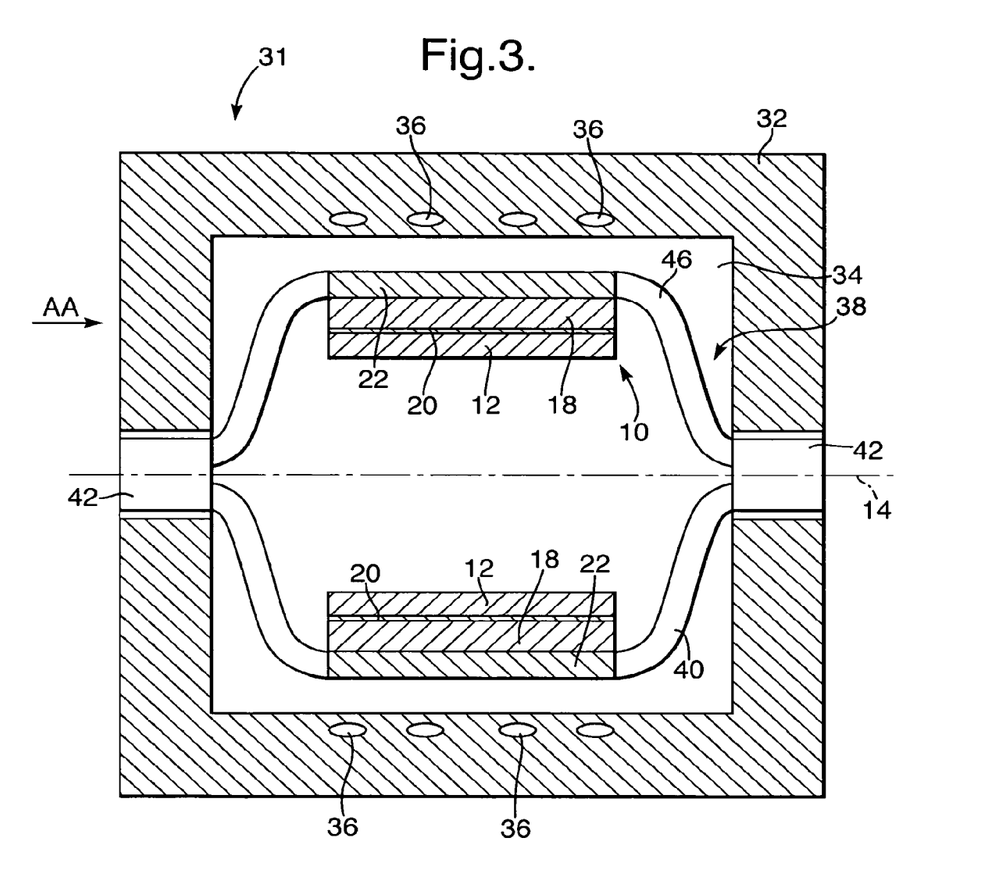
FIG. 3 illustrates a cross sectional diagram of an electrical machine including one embodiment of a retainer.

FIG. 3 illustrates a cross sectional diagram of a generator 31 comprising a rotor 10 and a stator 32. The rotor 10 is similar to the rotor described with reference to FIG. 1. The stator 32 defines a cavity 34 in which the rotor 10 is located and comprises a plurality of coiled wires 36 located adjacent to the rotor 10. In use, the rotor 10 rotates within the cavity 34 and the magnetic flux from the magnets 18 induces an electrical current in the coils of wire 36. The electrical current may be stored in an electrical energy storage means (not illustrated in FIG. 3) such as a battery or a capacitor or used directly to provide electrical energy to an appliance or other electrical\electronic device.

Figure 7:
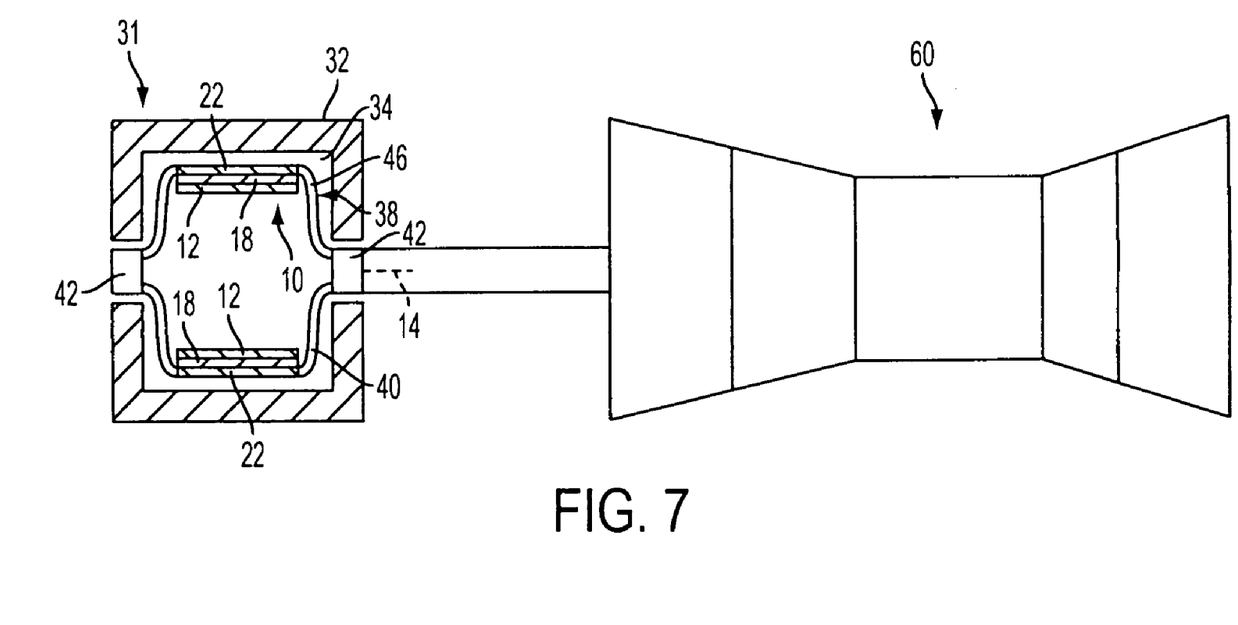
FIG. 7 illustrates a cross sectional diagram of an electrical machine being driven by a gas turbine engine according to the present invention.

The rotor 10 comprises a means for connecting the rotor 10 to a driver. In FIG. 3, the rotor is connected to a driver 60 by an end cone 40 and a connector 42 but may be connected by gearing or any other suitable connecting mechanism. The end cone 40 illustrated in FIG. 3 is an integral component of the rotor 10. Alternatively, the end cone 40 may be a separate component to the rotor 10. The driver 60 may be a gas turbine engine, as shown in FIG. 7, or any other suitable means for driving an electrical machine. One advantage provided by a high speed generator when coupled to a gas turbine engine is that it reduces or removes the gearing required for connecting them together. This is because turbines in a gas turbine engine rotate at high speeds (greater than 10,000 RPM). If the rotor in the generator cannot rotate at that speed, gearing is required to reduce the speed at which the rotor rotates.

The end cone 40 comprises titanium and is, in this embodiment, welded to the retainer 22. The retainer 22 is therefore integral with the end cone 40. The end cone 40, as mentioned previously, may be a separate component to the rotor 10 but fastened/connected to the retainer 22 by fasteners. In prior art rotors, it was necessary to connect the end cone to the rotor body using a fastener such as a bolt because the carbon fibre and epoxy retainer could not be integrally connected to the end cone. Therefore, the embodiment illustrated in FIG. 3 provides an advantage in that it does not require a fastener to connect the rotor to the end cone. In prior art rotors, the fasteners required maintenance or replacement due to wear. One advantage provided by the embodiment illustrated in FIG. 3 is that the rotor may require less maintenance. Additionally, due to the removal of the fastener, the generator illustrated in FIG. 3 may weigh less than a prior art generator.

In prior art rotors, it was necessary to provide a copper screen, sandwiched between the magnets and the retainer to prevent electrical 'eddy' currents flowing in the magnets which heated the magnets and reduced\removed their magnetic properties. Embodiments of the present invention provide an advantage in that the MMC retainer 22 acts as an electromagnetic screen and reduces\removes the electrical 'eddy' currents flowing in the magnets 18.

Another advantage provided by using an MMC retainer is that the thickness of MMC required for retaining the magnets 18 to the rotor 12 may be less than that for a carbon fibre and epoxy resin retainer. This may reduce the distance between the magnets 18 and the coils of wire 36 and thereby increase the magnetic flux density in the air gap. Alternatively, the overall size and weight of the electrical machine may be reduced while at the same time maintaining a similar rated power to a larger electrical machine using a carbon fibre and epoxy resin retainer.

Figure 4:
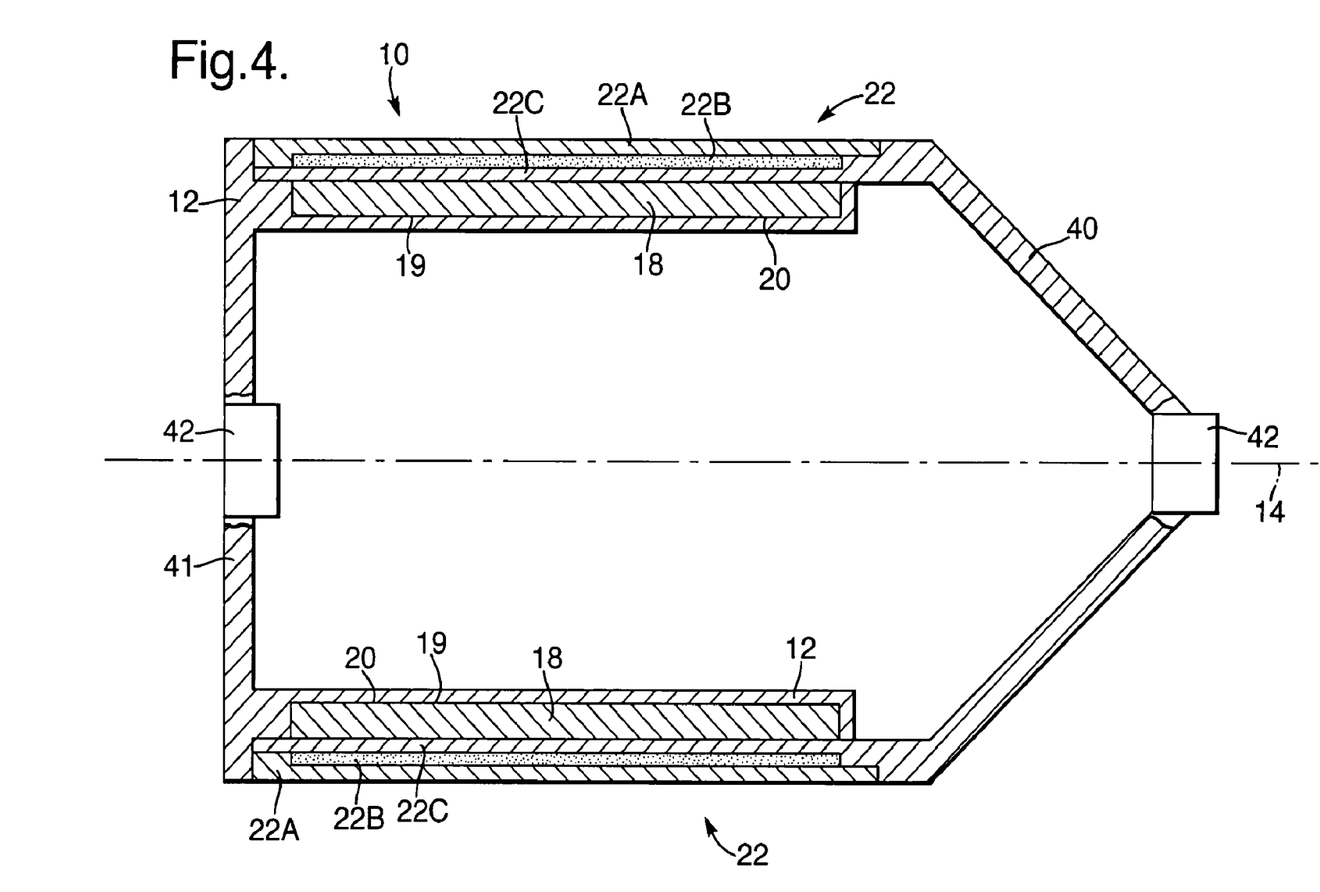
FIG. 4 illustrates a schematic axial cross sectional diagram of a rotor according to a second embodiment of the invention.

FIG. 4 illustrates a further schematic, axial cross sectional diagram of a rotor 10 according to a second embodiment of the invention for an electrical machine. Where the features illustrated in FIG. 4 are similar to the features illustrated in FIGS. 1 & 3, the same reference numerals are used. In this embodiment, the retainer 22 is composite and includes an outer sleeve 22A, a metal matrix composite portion 22B and an inner sleeve 22C. The outer sleeve 22A and the inner sleeve 22C comprise little or no metal matrix composite (MMC) and in this embodiment, comprise only titanium. The metal matrix composite portion 22B includes at least one elongate fibre embedded in a metal matrix that extends circumferentially around the inner sleeve 22C. The retainer 22 illustrated in FIG. 4 provides an advantage in that it is possible to machine into the inner sleeve 22C without breaking the elongate fibres in the metal matrix composite portion 22B. Consequently, the retainer 22 may be stronger, when machined, than a retainer that does not comprise an inner sleeve 22C.

The end cone 40 comprises titanium and is, in this embodiment, either welded to the outer sleeve 22A and/or inner sleeve 22C or an extension to the outer sleeve 22A and/or inner sleeve 22C. The retainer 22 is therefore integral with the end cone 40. As mentioned above, this provides an advantage in that it does not require a fastener to connect the rotor to the end cone 40.

The outer sleeve 22A and the inner sleeve 22C of the retainer 22 and the rotor body 12 are welded to an end plate 41. The end plate 41 is connected to a connector 42. In another embodiment, the retainer 22 and the rotor body 12 are welded to two end plates 41. End plates 41 provides an advantage in that they occupy less space than end cones 40 and may therefore be useful in electrical machines where space is limited.

Figure 5:
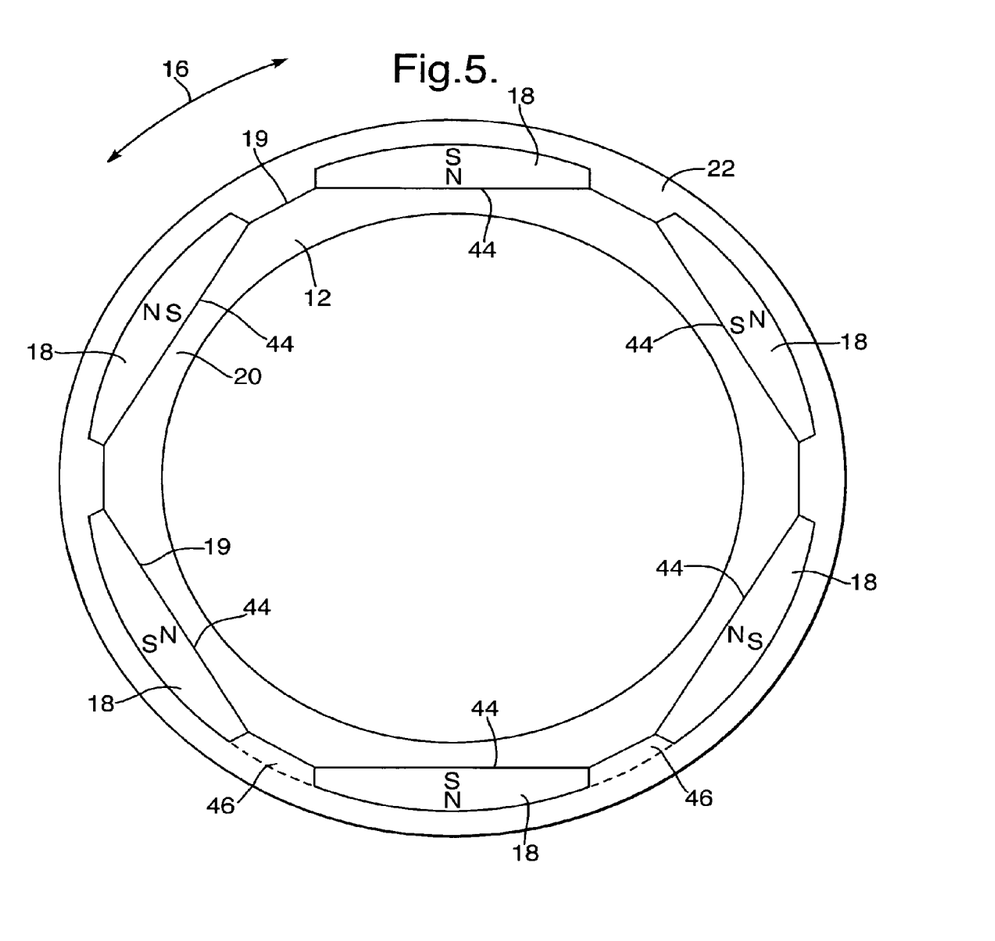
FIG. 5 illustrates a cross sectional front end view of a rotor.

FIG. 5 illustrates a cross sectional front view (along view AA illustrated in FIG. 3) of the rotor 10 described in the preceding paragraphs. The exterior surface 19 of the rotor body 12 comprises a plurality of grooves 44 in which the magnets 18 are located and which help to provide location of the magnets 18 during assembly of the rotor 10. The retainer 22 comprises filler portions 46, which define cavities on the inner surface of the retainer 22 and help to provide location of the magnets 18 during assembly of the rotor 10. The filler portions 46 are equally sized and are arranged symmetrically with equal circumferential separation.

The poles of the magnets 18 are arranged so that they are located at the radial interior and exterior of the magnets 18 and so that adjacent magnets 18 have different magnetic biases. For example, if a first magnet is arranged so that it's radial exterior part is a North and its radial interior part is a South, a second adjacent magnet will be arranged so that its radial exterior part is a South and its radial interior part is a North. When the rotor 10 rotates (in the directions indicated by arrow 16), the magnetic flux lines move through the coils of wire 36 in the stator 32 (illustrated in FIG. 3) and induce an electrical current.

Figure 6:
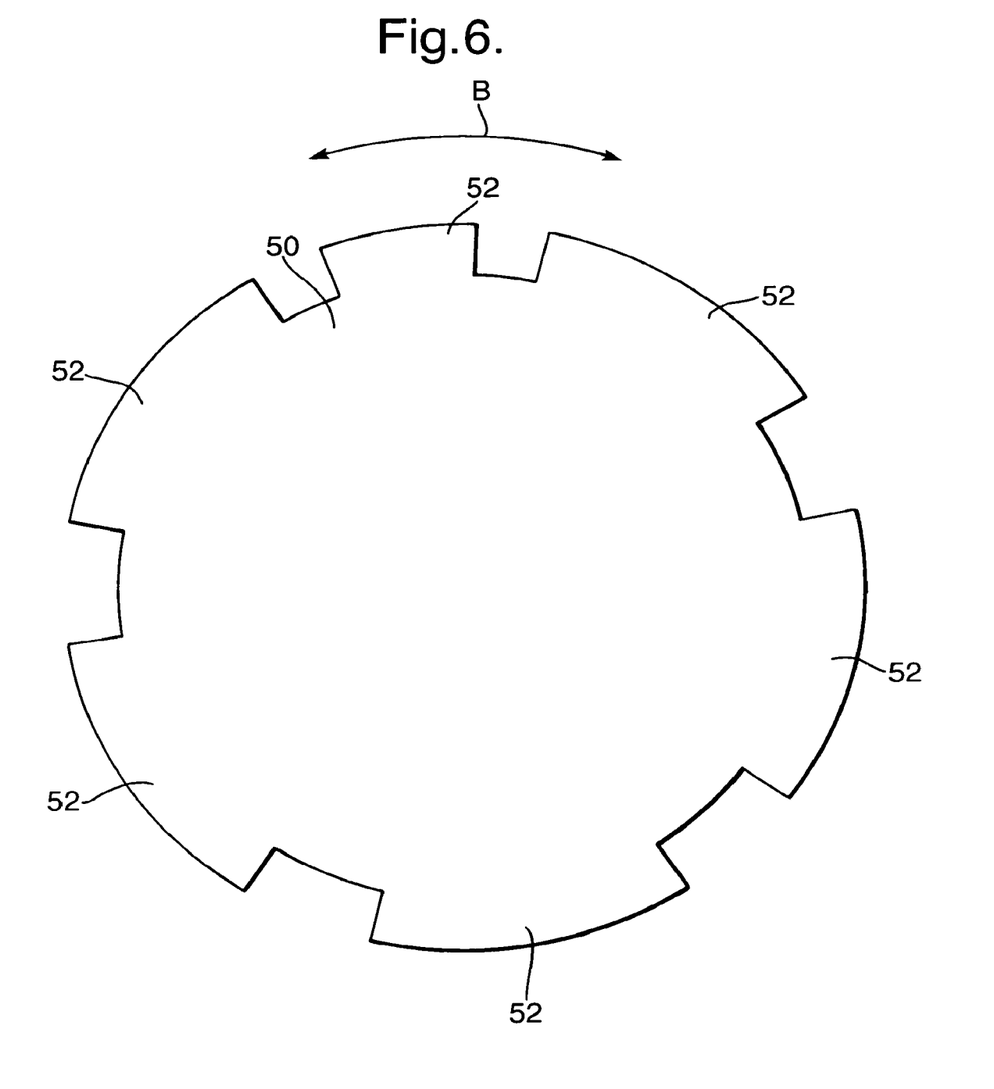
FIG. 6 illustrates a front view of a mandrel for forming a sleeve.

The retainer 22 may be a pre-formed or machined sleeve. In a first embodiment, the sleeve is formed by providing a mandrel 50 as illustrated in FIG. 6. The mandrel 50 in this example, is circular and comprises six outwardly extending portions 52. These portions are equally sized and are arranged with equal circumferential separation. One or more elongate fibres are wrapped around the circumference (as indicated by arrow B in FIG. 6) of the mandrel 50. In order to achieve a desired thickness of fibres, it may be necessary to wrap the fibres around the mandrel 50 several times.

A liquid metal is then applied to the fibres so that the fibres become embedded within a metal matrix. The metal matrix may comprise titanium. Alternatively, resin impregnated fibres may be wrapped around the circumference of the mandrel. Pressure and heat is then applied to consolidate the elongate fibres and matrix to form a sleeve. The sleeve which is formed around the mandrel is then cooled. The mandrel is then subsequently removed from the sleeve. The magnets are inserted into portions of the sleeve corresponding to the portions 52 of the mandrel. A rotor body is then inserted inside the assembly. In order to ensure that the rotor body and the sleeve fit, the rotor body is cooled, for example with liquid nitrogen prior to its insertion into the sleeve. The rotor body then expands to contact the interior surface of the sleeve. This method therefore provides a pre-formed sleeve into which magnets and a rotor body may be inserted.

In a second embodiment (described with reference to the embodiment illustrated in FIG. 4), a circular inner sleeve 22C is provided and at least one elongate fibre is wrapped around its circumference. A matrix material (for example, a metal such as a titanium alloy) is then applied to the at least one elongate fibre as a liquid, a solid or a vapour. Alternatively, resin impregnated elongate fibres may be wrapped around the circumference of the inner sleeve 22C. An outer sleeve 22A is then provided to sandwich the elongate fibres and matrix and form an assembly. A retaining sleeve is formed by applying heat and pressure to the assembly. In one embodiment, the retaining sleeve is formed by hot isostatic pressing (HIP). It is possible to use HIP in this embodiment because pressure can be applied on the outer sleeve 22A and on the inner sleeve 22C. Hot Isostatic pressing (HIP) is well known in the art of consolidating materials using pressure and heat and will therefore not be discussed in detail here.

The magnets can then be inserted into pockets which are pre-formed or machined into the inner sleeve 22C. A rotor body is then inserted inside the assembly. In order to ensure that the rotor body and the sleeve fit, the rotor body is cooled, for example with liquid nitrogen, prior to its insertion into the sleeve. The rotor body then expands to contact the interior surface of the sleeve. End cones 40 or end plates 41 are then welded onto the retaining sleeve. This method therefore provides a pre-formed sleeve into which magnets and a rotor body may be inserted.

Although embodiments of the present invention have been described with reference to various examples, it should be appreciated that modifications to the examples given can be made without departing from the scope of the invention as claimed. For example, the end cone 40 may be an integral component with the rotor 10 or it may be a separate component to the rotor 10. The rotor 10 may be rotor for any electrical machine and may be a rotor for a motor or a generator. Instead of machining pockets into the retainer 22 or pre-forming the retainer 22 to comprise pockets, a separate tube comprising magnets and lightweight non-magnetic material could be welded or bolted onto the retainer 22 prior to the insertion of the rotor body.

Whilst endeavouring the foregoing specification to draw attention to those features of the invention believed to be of particular importance it should be understood that the applicant claims protection in respect of any patentable feature or combination of features hereinbefore referred to and/or shown in the drawings whether or not particular emphasis has been placed thereon.

We claim:

1. A rotor for an electrical machine comprising a rotor body, at least one magnet coupled to the rotor body and a retainer for retaining the at least one magnet to the rotor body, a means for connecting the rotor to a driver, the retainer comprising at least one elongate fibre in a metal matrix, the retainer being connected to the means for connecting the rotor to a driver.

2. A rotor as claimed in claim 1, wherein the rotor body has an exterior surface and the retainer retains the at least one magnet to the exterior surface.

3. A rotor for an electrical machine comprising a rotor body, at least one magnet coupled to the rotor body and a retainer for retaining the at least one magnet to the rotor body, a means for connecting the rotor to a driver, the retainer comprising at least one elongate fibre in a metal matrix, the retainer being connected to the means for connecting the rotor to a driver wherein the retainer includes an inner sleeve, an outer sleeve and a portion including the at least one elongate fibre in the metal matrix, the portion being sandwiched between the inner and outer sleeves.

4. A rotor as claimed in claim 3, wherein the inner and outer sleeves each substantially comprise metal.

5. A rotor as claimed in claim 1, wherein the retainer is integral with the means for connecting the rotor to a driver.

6. A rotor as claimed in claim 5, wherein the retainer is welded to the means for connecting the rotor to the driver.

7. A rotor as claimed in claim 1, wherein the retainer comprises an exterior surface and an interior surface, the interior surface comprising at least one cavity for receiving the at least one magnet.

8. A rotor as claimed in claim 1, wherein the at least one elongate fibre comprises silicon carbide.

9. A rotor as claimed in claim 1, wherein the metal matrix comprises titanium.

10. A rotor as claimed in claim 1, wherein the at least one magnet is coupled to the rotor body by an adhesive.

11. A rotor as claimed in claim 1, wherein the radial exterior surface of the at least one magnet contacts the retainer.

12. A rotor as claimed in claim 1, wherein the retainer is a pre-formed sleeve.

13. A rotor as claimed in claim 1, wherein the retainer has been hot isostatically pressed (HIP).

14. An electrical machine comprising a stator and a rotor as claimed in claim 1.

* * * * *